(12) United States Patent
Shen

(10) Patent No.: US 8,811,949 B2
(45) Date of Patent: Aug. 19, 2014

(54) ANTI-THEFT MOBILE TERMINAL AND ANTI-THEFT METHOD FOR MOBILE TERMINAL

(75) Inventor: Shaowu Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 268 days.

(21) Appl. No.: 13/258,287

(22) PCT Filed: Jun. 11, 2010

(86) PCT No.: PCT/CN2010/073841
§ 371 (c)(1),
(2), (4) Date: Jun. 18, 2012

(87) PCT Pub. No.: WO2011/088652
PCT Pub. Date: Jul. 28, 2011

(65) Prior Publication Data
US 2012/0244839 A1   Sep. 27, 2012

(30) Foreign Application Priority Data

Jan. 21, 2010 (CN) .......................... 2010 1 0001657

(51) Int. Cl.
| H04M 1/66 | (2006.01) |
| H04M 1/68 | (2006.01) |
| H04M 3/16 | (2006.01) |
| H04L 29/06 | (2006.01) |
| H04W 12/06 | (2009.01) |
| H04M 1/725 | (2006.01) |

(52) U.S. Cl.
CPC ............... H04M 1/66 (2013.01); H04L 63/083 (2013.01); H04W 12/06 (2013.01); H04M 1/72519 (2013.01)

USPC ........ 455/411; 455/410; 455/414.1; 455/466; 455/574; 380/247

(58) Field of Classification Search
CPC ..... H04W 12/06; H04W 12/08; H04W 12/12; H04W 88/02; H04W 48/08; H04W 4/001; H04W 4/16; H04L 63/083; G06F 21/88; H04M 1/0262; H04M 1/172519; H04M 3/42
USPC ........... 455/410–411, 414.1, 414.4, 415, 466, 455/572–574; 380/247–250; 713/182–184, 713/168
See application file for complete search history.

(56) References Cited

U.S. PATENT DOCUMENTS

| 7,137,003 | B2 * | 11/2006 | Krishnan et al. ............... 713/172 |
| 8,265,695 | B2 * | 9/2012 | Borean et al. .................. 455/558 |
| 2009/0093235 | A1 * | 4/2009 | Grealish et al. ............... 455/411 |
| 2009/0270126 | A1 | 10/2009 | Liu | |
| 2010/0009697 | A1 | 1/2010 | Sip | |

FOREIGN PATENT DOCUMENTS

| CN | 1859670 A | 11/2006 |
| CN | 101026422 A | 8/2007 |
| CN | 101039479 A | 9/2007 |
| CN | 100473194 C | 3/2009 |
| CN | 101459721 A | 6/2009 |
| CN | 101568119 A | 10/2009 |
| CN | 101610500 A | 12/2009 |

OTHER PUBLICATIONS

International Search Report in international application number: PCT/CN2010/073841, mailed on Nov. 4, 2010.
English Translation of the Written Opinion of the International Search Authority in international application number: PCT/CN2010/073841, mailed on Nov. 4, 2010.
Supplementary European Search Report in European application No. 10843692.4, mailed on Apr. 23, 2014.

* cited by examiner

*Primary Examiner* — Quan M Hua
(74) *Attorney, Agent, or Firm* — Oppedahl Patent Law Firm LLC

(57) ABSTRACT

An anti-theft mobile terminal is disclosed, including: a setting module (10); an encryption module (11), configured to set a screen-lock password and an information return verification password of the mobile terminal; a password verification module (12), configured to verify a screen-unlock password input by a user; a detection module (18), configured to trigger a power management module (13) when detecting that an SIM card or battery has been pulled out, or the battery has run down longer than a preset duration; the power management module (13), configured to stop power supply from the battery of the mobile terminal and start a standby power supply to supply power to an information return module (14), an information deleting module (15), a positioning module (16), and an IMSI; the information return module (14), configured to verify a received information return verification password and return information saved in a set storage area after successful verification; the information deleting module (15), configured to delete the returned information; the positioning module (16), configured to position the mobile terminal, and periodically transmit positioning information to a network side or a specified mobile terminal. An anti-theft method for mobile terminals is also disclosed.

8 Claims, 3 Drawing Sheets

ANTI-THEFT MOBILE TERMINAL AND ANTI-THEFT METHOD FOR MOBILE TERMINAL

TECHNICAL FIELD

The present disclosure relates to anti-theft technologies for mobile terminals, and in particular to an anti-theft mobile terminal and an anti-theft method for a mobile terminal.

BACKGROUND

Due to system complexity and application diversity, mobile terminals become like personal computers (PCs) when they are used. Users have become accustomed to storing their important personal information and files in mobile terminals because of portability. This is especially the case for business mobile terminals, which store large amounts of important user information. However, such portability also produces a high risk of losing mobile terminals. A large number of mobile terminal users have experienced such loss. Once a mobile terminal is lost, a user may suffer great economic loss. Therefore, if a mobile terminal is lost, a user would always want to ensure that personal information stored in the mobile terminal is well protected when recovering the lost mobile terminal. However, current mobile terminals obviously do not have this function.

At present, anti-theft methods commonly used for mobile terminals are as follows:

1. using a physical a case is for a mobile terminal: specifically, using a case for a mobile terminal, attaching a chain-like link on the case, and tying the mobile terminal to the user's clothes through the chain-like link to prevent anti-theft; this method can reduce the probability of loss of a terminal, however, once a mobile terminal is lost, a user cannot prevent loss of the user's personal information;

2. arranging a mechanical locking apparatus inside a mobile terminal: a mechanical locking apparatus is placed inside a mobile terminal, wherein, generally, the locking apparatus includes a lock latch, a lock body, a spring, an electromagnetic coil, an iron core, and a locking tongue panel connected to a cell panel; in this method, the locking apparatus is complex in structure and is difficult to implement within the small space of a mobile terminal, meanwhile, the mechanical lock can be easily unlocked by persons skilled in lock-picking, thereby being an ineffective anti-theft mechanism;

3. setting a startup password for a mobile terminal, generally, setting a four-digit PIN code for encryption: such anti-theft method is simple but passwords can be easily cracked, system can be easily reset by using professional cracking software or by refreshing the mobile terminal, therefore, great security risks still exist; and 4. returning related information stored in a mobile terminal through a short message after the mobile terminal is stolen, specifically, returning important information of a user stored in a set storage area, such as an address book, to a new mobile terminal of the user: this method is very effective in returning personal contact information, but has certain limitations, for example, a user cannot implement information return if the mobile terminal is powered off or if a Subscriber Identity Module (SIM) card is replaced.

SUMMARY

In view of the above mentioned, the main objective of the present disclosure is to provide an anti-theft mobile terminal and an anti-theft method for a mobile terminal, so that related information in a mobile terminal can be retrieved when the mobile terminal is stolen and the mobile terminal can be accurately positioned.

In order to the above objective, the technical solution of the present disclosure is implemented as follows.

An anti-theft mobile terminal includes a setting unit, an encryption module, a password verification module, a detection module, a power management module, an information return module, an information deleting module, and a positioning module; wherein the setting unit is configured to set an International Mobile Subscriber Identity (IMSI) for the mobile terminal;

the encryption module is configured to set a screen-lock password and an information return verification password of the mobile terminal;

the password verification module is configured to verify a screen-unlock password input by a user, and unlock a screen after successful verification;

the detection module is configured to detect a battery or an SIM card of the mobile terminal, and trigger the power management module to manage a power supply when detecting that the SIM card has been pulled out, the battery has been pulled out, or the battery has run down longer than a preset duration;

the power management module is configured to stop a power supply function of the battery of the mobile terminal and start a standby power supply to supply power to the information return module, the information deleting module, the positioning module, and the IMSI;

the information return module is configured to receive an information return verification password from another mobile terminal, verify the information return verification password, and return information saved in a set storage area in the mobile terminal to the another terminal after successful verification;

the information deleting module is configured to delete information having been returned by the information return module from the set storage area; and the positioning module is configured to position the mobile terminal, and periodically transmit positioning information to a network side or a specified mobile terminal.

Preferably, the mobile terminal may further include:

an SIM card binding module, configured to bind a set SIM card to the mobile terminal, and when the mobile terminal uses a non-set SIM card, refuse to provide a network access service to the non-set SIM card.

Preferably, the SIM card binding module may be further configured to bind the IMSI of the mobile terminal to the set SIM card.

Preferably, the password verification module may be configured to trigger the power management module to manage the power supply when the number of verification attempts exceeds a preset threshold, and is started after the mobile terminal is restarted or powered on again.

Preferably, the power management module may not supply power to the information return module, the information deleting module, the positioning module, and the IMSI when the mobile terminal is powered by the battery normally.

An anti-theft method for a mobile terminal includes: setting a screen-lock password and an information return verification password of a mobile terminal; and setting an IMSI for the mobile terminal; the method further includes:

receiving and verifying a screen-unlock password input by a user, and unlocking a screen of the mobile terminal alter successful verification; when detecting that an SIM card of the mobile terminal has been pulled out, or a battery of the mobile terminal has been pulled out, or the battery has run down longer than a preset duration, stopping supply of power from the battery of the mobile terminal, starting a standby power supply, enabling the mobile terminal to enter an automatic running state, and using the IMSI of the mobile terminal as a communication identity;

wherein the automatic running state comprises: receiving an information return verification password from another mobile terminal and verifying the information return verification password, returning information saved in a set storage area in the mobile terminal to the another terminal after successful verification, and deleting returned information from the set storage area; and starting an automatic positioning function of the mobile terminal and periodically transmitting current positioning information of the mobile terminal to a network side or a specified mobile terminal.

Preferably, the method may further include:

binding a set SIM card to the mobile terminal, and when the mobile terminal uses a non-set SIM card, refusing to provide a network access service to the non-set SIM card.

Preferably, the method may further include:

binding the IMSI of the mobile terminal to the set SIM card, and when the mobile terminal uses a non-set SIM card, refusing to provide a network access service to the non-set SIM card.

Preferably, the method may further include:

when an input verification password is incorrect to the mobile terminal and the number of verification attempts exceeds a preset threshold, stopping supply of power from the battery of the mobile terminal, and starting the standby power supply, and enabling the mobile terminal to enter the automatic running state; and automatically locking the screen of the mobile terminal when the mobile terminal is restarted or powered on again.

Preferably, the method may further include:

starting the standby power supply by the mobile terminal and enabling the mobile terminal itself to enter the automatic running state when the SIM card or the battery in the mobile terminal has been pulled out longer than the preset duration.

In the present disclosure, by means of additional arrangement of the IMSI, the password encryption module, the positioning module and the standby power supply in a mobile terminal, when the mobile terminal is stolen or a screen-lock password has been input for many times, the mobile terminal stops its battery from supplying power, starts the standby power supply, and enters the automatic running state, i.e., an anti-theft state. In this case, the standby power supply only supplies power to a module related to the anti-theft state. In this way, the mobile terminal verifies a password requested to be input upon receiving a request for information return from a user who sends this request through another mobile terminal, and sends related information stored in a set storage area to the another mobile terminal after successful verification. Meanwhile, the positioning module of the stolen mobile terminal is started, automatically positions the mobile terminal, and sends positioning information to a network side or a specified mobile terminal. In this way, when a mobile terminal is lost, the lost mobile terminal can be accurately positioned, and can send related information stored in its set storage area to another terminal through which a request for information return is sent, after a user sends a password for information return through the another mobile terminal to the lost mobile terminal. The loss due to loss of a mobile terminal can be greatly reduced by means of the technical solution disclosed in the present disclosure.

DETAILED DESCRIPTION

The basic idea of the present disclosure is that: an IMSI, a password setting module, a positioning module, a standby power supply and the like are arranged in a mobile terminal, so that when the mobile terminal is stolen or a screen-lock password has been input for many times, the mobile terminal stops a mobile terminal battery from supplying power, starts the standby power supply, and enters an automatic running state, i.e., an anti-theft state, in this case, the standby power supply only supplies power to a module related to the anti-theft state. The mobile terminal verifies a password requested to be input after receiving a request for information return which is sent by the user through another mobile terminal, and sends related information stored in a set storage area after successful verification to the mobile terminal which sent the request. Meanwhile, the positioning module of the stolen mobile terminal is started, automatically positions the mobile terminal, and sends positioning information to a network side or a specified mobile terminal.

Figure 1:
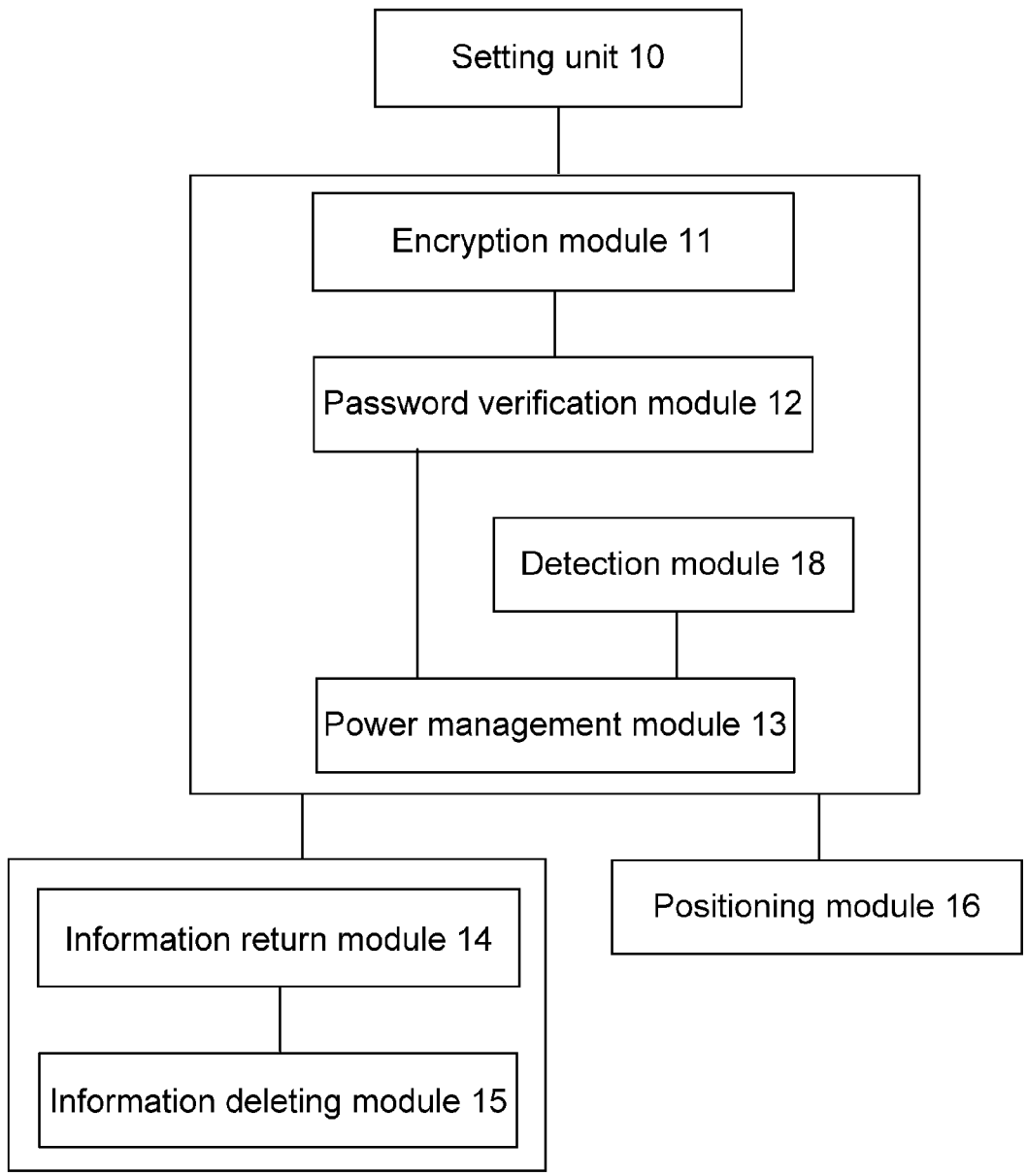
FIG. 1 is a structure schematic diagram of an anti-theft mobile terminal according to an embodiment of the present disclosure.

FIG. 1 is a structure schematic diagram of an anti-theft mobile terminal according to an embodiment of the present disclosure. As shown in FIG. 1, the anti-theft mobile terminal in this embodiment includes: a setting unit 10, an encryption module 11, a password verification module 12, a detection module 18, a power management module 13, an information return module 14, an information deleting module 15, and a positioning module 16.

The setting unit 10 is configured to set an IMSI for the mobile terminal. After the mobile terminal is lost and enters an anti-theft state, the IMSI is started to act as the identity of the lost mobile terminal so as to implement relevant communication with the lost mobile terminal.

The encryption module 11 is configured to set a screen-lock password and an information return verification password of the mobile terminal, wherein the screen-lock password and the information return verification password can be a password whose number of digits is not limited, which may be numeral or character combination, and is set by a user after the mobile terminal is started. The screen-lock password is a password which is required to be input to unlock the screen of the mobile terminal when the user wants to use the mobile terminal. The information return verification password is a password for verifying whether a requester is an authorized user upon a request for information return is received. When the verification password is input correctly, the request for information return is considered valid.

The password verification module 12 is configured to verify a screen-unlock password input by a user, unlock the screen after successful verification, and trigger the power management module to manage a power supply when the number of verification attempts exceeds a preset threshold.

Here, the threshold of the number of verification attempts for a screen-unlock password may be set to 6, that is, when a user inputs incorrect screen-unlock password six times consecutively, the mobile terminal enters an automatic running state, i.e., an anti-theft state. When detecting that a battery or an SIM card of the mobile terminal has been pulled out longer than a preset duration, the mobile terminal enters the automatic running state. The preset duration can be one hour, two hours, 24 hours, or a week, and is set by a mobile terminal user.

In the present disclosure, the password verification module 12 is started after the mobile terminal is restarted or powered on again, i.e., after the mobile terminal is restarted or powered on again, the password verification module 12 considers it a normal start and prompts a user to input the screen-unlock password.

The detection module 18 is configured to detect the battery or the SIM card of the mobile terminal, and trigger the power management module 13 to manage the power supply when detecting that the SIM card has been pulled out, the battery has been pulled out, or the battery has run down longer than a preset duration. The detection module 18 is configured to prevent the user from being unable to communicate with and find the lost mobile terminal in the case where a thief pulls out the SIM card or battery, or powers off the stolen mobile terminal. To overcome this defect of existing mobile terminals, the detection module 18 is arranged for the mobile terminal in the present disclosure to start a standby power supply automatically to enable the mobile terminal enter the anti-theft state when detecting that the battery of the mobile terminal has run down longer than the preset duration or the SIM card has been pulled out longer than the preset duration. The preset duration can be set as 30 minutes, 20 minutes, or one day.

The power management module 13 is configured to stop power supply from the battery and start a standby power supply to supply power to the information return module 14, the information deleting module 15, the positioning module 16, and the IMSI; that is to say, when determining that the number of verification attempts for a screen-unlock password input by a user exceeds the preset threshold, the battery of the mobile terminal is automatically cut off and no power is supplied to corresponding processing units, then, the mobile terminal enters a power-off state like existing mobile terminals does. In the present disclosure, the standby power supply is connected to the battery of the mobile terminal, charged by the battery of the mobile terminal when the mobile terminal is working normally, and supplies power to relevant modules in the anti-theft state in the mobile terminal once the battery of the mobile terminal stops working, so that the anti-theft function of the mobile terminal can be implemented. Detailed description is given below on how the mobile terminal implements the anti-theft function according to the present disclosure.

The power management module 13 does not supply power to the information return module 14, information deleting module 15, positioning module 16 and the IMSI when the mobile terminal is powered by the battery normally.

The information return module 14 is configured to receive and verify the information return verification password, and return information saved in a set storage area in the mobile terminal to another terminal when verification succeeds. When a user confirms that his/her mobile terminal is lost, the user can send a request for information return to the lost mobile terminal using any other mobile terminal; specifically, the request is sent to the lost mobile terminal through a short message, the content of which is the information return verification password set by the user before the mobile terminal is lost. After the lost mobile terminal starts an automatic running mode, the lost mobile terminal, once upon receiving the short message, takes the message as the information return verification password by default, extracts the content from the short message and compares the content with the information return verification password stored in the lost mobile terminal; if they are consistent, the lost mobile terminal automatically sends related information stored in the set storage area in the lost mobile terminal to the terminal who sent the request. Specifically, the above set storage area may be an address book storage area, a short message storage area, or a user personal information storage area, etc.

Since the lost mobile terminal has entered the anti-theft state, the SIM card in the mobile terminal does not work any longer. Therefore, in order to enable the request for information return to be responded by the lost mobile terminal, an IMSI set for the lost mobile terminal is required to be used as an identity, that is, the mobile terminal is located in a network environment supporting the IMSI and can receive a short message and the like from any other mobile terminal.

The information deleting module 15 is configured to delete information having been returned by the information return module 14 from the set storage area. When the information return module 14 returns related information stored in the set storage area to another mobile terminal, the information deleting module 15 deletes the information. In this way, even though the screen-lock password set for the lost mobile terminal is cracked, the information cannot be obtained, which effectively protects privacy of the mobile terminal user.

The positioning module 16 is configured to position the mobile terminal, and periodically transmit positioning information to a network side or a specified mobile terminal. In the present disclosure, the positioning module 16 can be implemented by a Global Positioning System (GPS) or an equivalent processor. The GPS positioning function can be simply implemented on a mobile terminal. In the present disclosure, the positioning module 16 can be also a Geographic Information System (GIS) positioning instrument, and specifically, determines location information of the mobile terminal according to base station location information reported by the mobile terminal to a network side, an angle at which a signal is transmitted from the mobile terminal to the base station and power of the signal. In the present disclosure, when the positioning module 16 is started, it automatically positions the mobile terminal and reports positioning information to a network side or a specified mobile terminal. In this way, once the mobile terminal is lost, current positioning information of the lost mobile terminal can be provided to a relevant person, thus giving the person a clue to finding of the lost mobile terminal.

Figure 2:
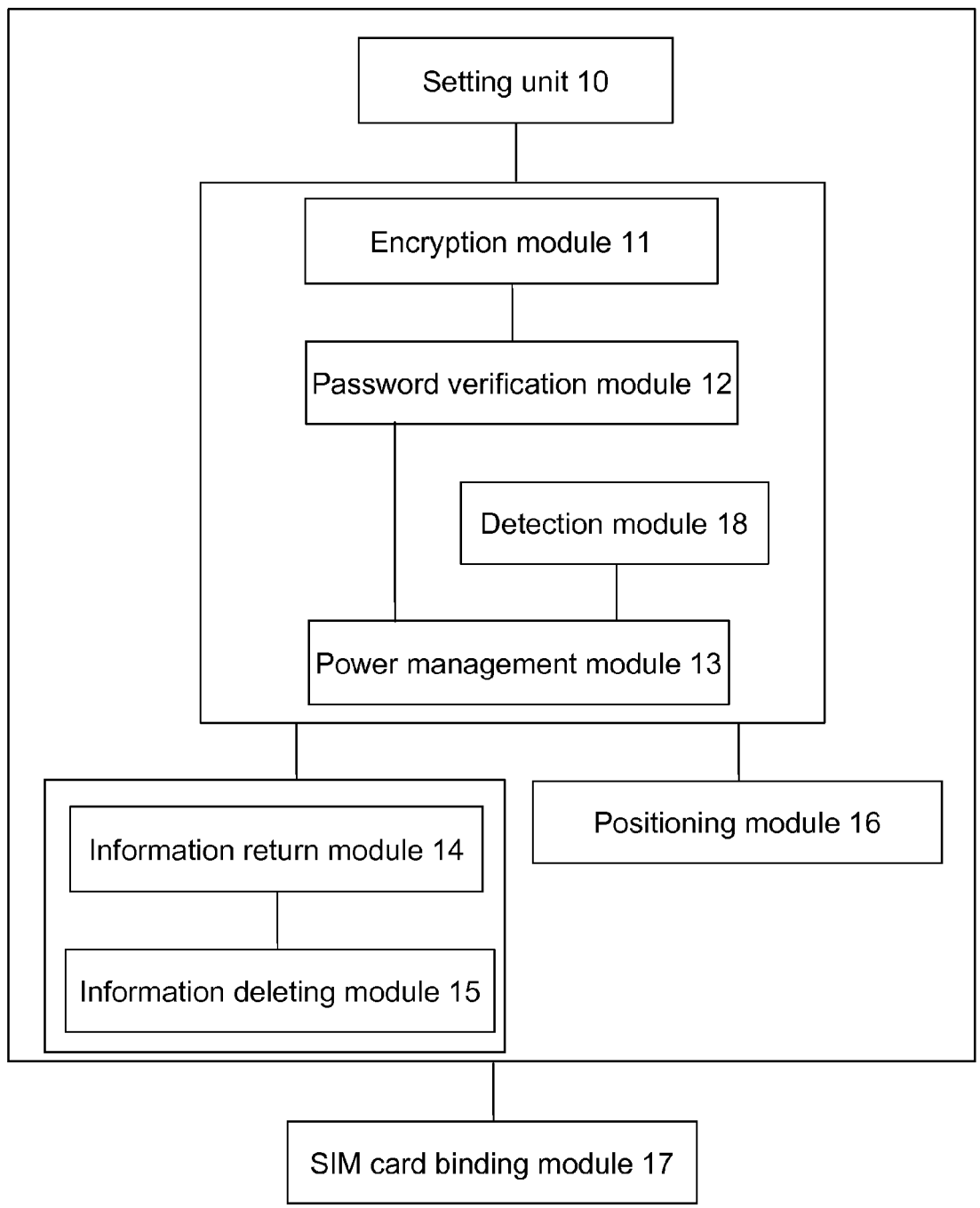
FIG. 2 is another structure schematic diagram of an anti-theft mobile terminal according to an embodiment of the present disclosure.

FIG. 2 is another structure schematic diagram of an anti-theft mobile terminal according to an embodiment of the present disclosure. As shown in FIG. 2, based on the terminal illustrated in FIG. 1, the anti-theft mobile terminal further includes:

an SIM card binding module 17, configured to bind a set SIM card to the mobile terminal, and refuse to provide a network access service to a non-set SIM card when the mobile terminal uses the non-set SIM card; wherein the function of the SIM card binding module 17 can be set by a user, for example, when the user selects the function of binding the current mobile terminal to the current inserted SIM card, the mobile terminal enables the binding function. With this function enabled, the mobile terminal does not support any other SIM card except its bound SIM card unless a binding relationship is set between the mobile terminal and other SIM card.

Or the SIM card binding module is further configured to bind the IMSI to the set SIM card, and refuse to provide a network access service to a non-set SIM card when the mobile terminal uses the non-set SIM card. The principle of binding the IMSI to the SIM card is the same as that of binding the SIM card to the mobile terminal.

Figure 3:
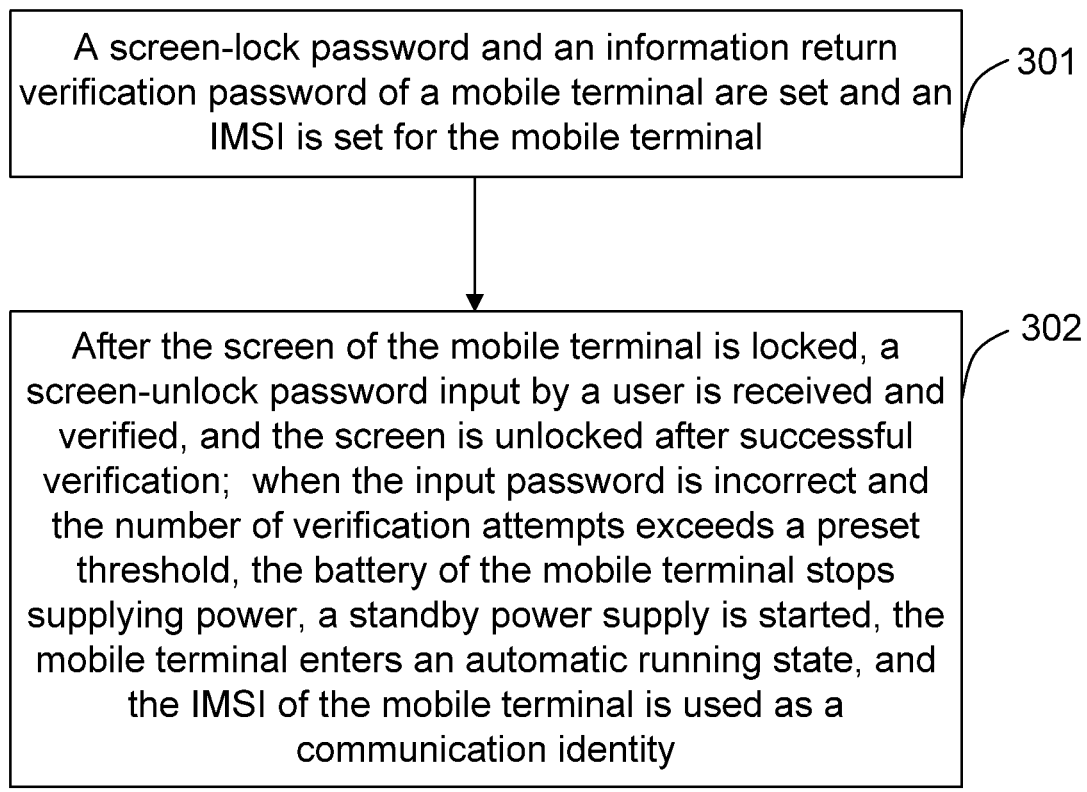
FIG. 3 is a flowchart of an anti-theft method for a mobile terminal according to an embodiment of the present disclosure.

FIG. 3 is a flowchart of an anti-theft method for a mobile terminal according to an embodiment of the present disclosure. As shown in FIG. 3, the method includes the following steps:

step 301: a screen-lock password and an information return verification password of the mobile terminal are set; and an IMSI is set for the mobile terminal;

in this step, after the mobile terminal enters a normal running state, the screen-lock password and the information return verification password are set through corresponding setting functions, wherein these passwords are set by a user, and can be numeral or/and character combination. Setting the IMSI is equivalent to setting another network access mode for the mobile terminal; this mode is not started when the mobile terminal is working normally but started when the mobile terminal enters the anti-theft state. That is to say, the mobile terminal according to the present disclosure supports a multi-mode function, however, during actual working, only a single mode, either a network function supported by the IMSI (in the anti-theft state) or a network function supported by the SIM card (in normal working), can be enabled;

step 302: after the screen of the mobile terminal is locked, a screen-unlock password input by the user is received and verified, and the screen is unlocked when the password verification is successful; if the input password is incorrect and the number of verification attempts exceeds a preset threshold, a battery of the mobile terminal stops supplying power, a standby power supply is started and the mobile terminal enters an automatic running state, further, the IMSI of the mobile terminal is used as a communication identity; here, the mobile terminal enters the automatic running state, i.e. it enters the anti-theft state;

when the number of times of inputting an incorrect screen-lock password exceeds the preset threshold, the mobile terminal automatically enters the anti-theft state, at this moment, the mobile terminal appears to be powered off, disables the network function supported by the SIM card but enables the network function supported by the IMSI set in the mobile terminal. In fact, at this moment, the mobile terminal, with the help of the standby power supply, still supports a network communication function, which is, however, not controlled by a user.

It should be noted that when the SIM card or battery of the mobile terminal has been pulled out or the battery has been unable to supply power because of shutdown or battery faults or other reasons longer than a preset duration, the mobile terminal also enters the automatic running state, i.e., the anti-theft state. The preset duration can be set as 30 minutes, 20 minutes, or one day.

The automatic running state here includes: receiving an information return verification password from another mobile terminal and verifying the password, returning information saved in a set storage area in the mobile terminal to the another terminal after successful verification, and deleting information, which has been returned by the information return module, from the set storage area; and starting an automatic positioning function of the mobile terminal and periodically transmitting current positioning information of the mobile terminal to a network side or a specified mobile terminal.

In the present disclosure, besides the above-mentioned step 301 and step 302, the anti-theft method further includes: binding the SIM card to the mobile terminal, and refusing to provide a network access service to a non-set SIM card when the mobile terminal uses the non-set SIM card. The above function can be set by a user, for example, when the user selects the function of binding the current mobile terminal to the current inserted SIM card, the mobile terminal enables the binding function, thus, the mobile terminal does not support any other SIM card any longer except this SIM card inserted in the mobile terminal unless a binding relationship is additionally set between the mobile terminal and other SIM card.

Or the anti-theft method further includes: binding the IMSI of the mobile terminal to the set SIM card, and refusing to provide a network access service to a non-set SIM card when the mobile terminal uses the non-set SIM card. Binding of the IMSI to the set SIM card and binding of the mobile terminal to the set SIM card are the same, which is not detailed here again.

To prevent the mobile terminal from entering the anti-theft state in stead of the normal state due to an operation mistake or a failure in memorizing a password, the mobile terminal according to the present disclosure automatically locks its screen after being restarted and powered-on again, i.e., it automatically enters a screen-lock state after being started or powered on again, and can enter a normal working state after the user inputs a correct screen-unlock password.

The above are only preferred embodiments of the present disclosure, and not intended to limit the protection scope of the present disclosure.

The invention claimed is:

1. An anti-theft mobile terminal, comprising: a battery, a setting unit, an encryption module, a password verification module, a detection module, a power management module, an information return module, an information deleting module and a positioning module; wherein the setting unit is configured to set an International Mobile Subscriber Identity (IMSI) for the mobile terminal;

the encryption module is configured to set a screen-lock password and an information return verification password of the mobile terminal;

the password verification module is configured to verify a screen-unlock password input by a user, and unlock a screen after successful verification;

the detection module is configured to detect a battery or a Subscriber Identity Module (SIM) card of the mobile terminal, and trigger the power management module to manage a power supply when detecting that the SIM card has been pulled out, the battery has been pulled out, or the battery has run down longer than a preset duration;

the power management module is configured to stop a power supply function of the battery of the mobile terminal and start a standby power supply to supply power to the information return module, the information deleting module, the positioning module, and the IMSI;

the information return module is configured to receive an information return verification password from another mobile terminal, verify the information return verification password, and return information saved in a set storage area in the mobile terminal to the another terminal after successful verification;

the information deleting module is configured to delete information having been returned by the information return module from the set storage area; and the positioning module is configured to position the mobile terminal, and periodically transmit positioning information to a network side or a specified mobile terminal;

wherein the password verification module is configured to trigger the power management module to manage the power supply when the number of verification attempts exceeds a preset threshold, and is started after the mobile terminal is restarted or powered on again.

2. The mobile terminal according to claim 1, further comprising:
an SIM card binding module, configured to bind a set SIM card to the mobile terminal, and when the mobile terminal uses a non-set SIM card, refuse to provide a network access service to the non-set SIM card.

3. The mobile terminal according to claim 2, wherein the SIM card binding module is further configured to bind the IMSI of the mobile terminal to the set SIM card.

4. An anti-theft method for a mobile terminal comprising: setting a screen-lock password and an information return verification password of the mobile terminal; and setting an International Mobile Subscriber Identity (IMSI) for the mobile terminal; and further comprising:
receiving and verifying a screen-unlock password input by a user, and unlocking a screen of the mobile terminal after successful verification; when detecting that an SIM card of the mobile terminal has been pulled out, a battery of the mobile terminal has been pulled out, or the battery has run down longer than a preset duration, stopping supply of power from the battery of the mobile terminal, starting a standby power supply, enabling the mobile terminal to enter an automatic running state, and using the IMSI of the mobile terminal as a communication identity; wherein the automatic running state comprises: receiving an information return verification password from another mobile terminal and verifying the information return verification password, returning information saved in a set storage area in the mobile terminal to the another terminal after successful verification, and deleting returned information from the set storage area; and starting an automatic positioning function of the mobile terminal and periodically transmitting current positioning information of the mobile terminal to a network side or a specified mobile terminal; and
when an input verification password is incorrect to the mobile terminal and the number of verification attempts exceeds a preset threshold, stopping supply of power from the battery of the mobile terminal, starting the standby power supply, and enabling the mobile terminal to enter the automatic running state; and automatically locking the screen of the mobile terminal when the mobile terminal is restarted or powered on again.

5. The method according to claim 4, further comprising: binding a set SIM card to the mobile terminal, and when the mobile terminal uses a non-set SIM card, refusing to provide a network access service to the non-set SIM card.

6. The method according to claim 4, further comprising: binding the IMSI of the mobile terminal to a set SIM card, and when the mobile terminal uses a non-set SIM card, refusing to provide a network access service to the non-set SIM card.

7. The method according to claim 4, further comprising: starting the standby power supply by the mobile terminal and enabling the mobile terminal itself to enter the automatic running state when the SIM card or the battery in the mobile terminal has been pulled out longer than the preset duration.

8. The method according to claim 5, further comprising: binding the IMSI of the mobile terminal to the set SIM card, and when the mobile terminal uses a non-set SIM card, refusing to provide a network access service to the non-set SIM card.

* * * * *